United States Patent
Kwon et al.

(10) Patent No.: US 10,661,639 B2
(45) Date of Patent: May 26, 2020

(54) SUN VISOR FOR AUTOMOBILES

(71) Applicant: DONG WON TECH CO., LTD., Gimhae-si, Gyeongsangnam-do (KR)

(72) Inventors: Young Hyeon Kwon, Gimhae-si (KR); Seung Kwon Baek, Gimhae-si (KR); Ae Ni Park, Gimhae-si (KR)

(73) Assignee: DONG WON TECH CO., LTD., Gimhae-si, Gyeongsangnam-Do (KR)

( * ) Notice: Subject to any disclaimer, the term of this patent is extended or adjusted under 35 U.S.C. 154(b) by 160 days.

(21) Appl. No.: 16/035,052

(22) Filed: Jul. 13, 2018

(65) Prior Publication Data

US 2019/0381869 A1    Dec. 19, 2019

(30) Foreign Application Priority Data

Jun. 14, 2018    (KR) .......................... 10-2018-0068298

(51) Int. Cl.
*B60J 3/00*    (2006.01)
*B60J 3/02*    (2006.01)

(52) U.S. Cl.
CPC ........... *B60J 3/0239* (2013.01); *B60J 3/0252* (2013.01); *B60J 3/0265* (2013.01); *B60J 3/0278* (2013.01)

(58) Field of Classification Search
CPC ...... B60J 3/0265; B60J 3/0204; B60J 3/0278; B60J 3/0208; G02F 1/133308; A61F 9/045

See application file for complete search history.

(56) References Cited

U.S. PATENT DOCUMENTS

| | | | | |
|---|---|---|---|---|
| 4,174,864 A | * | 11/1979 | Viertel | B60J 3/0282 296/97.5 |
| 4,582,356 A | * | 4/1986 | Kaiser | B60J 3/0252 248/291.1 |
| 4,617,699 A | * | 10/1986 | Nakamura | B60J 3/0252 16/262 |
| 4,734,955 A | * | 4/1988 | Connor | B60J 3/0265 16/332 |
| 4,944,549 A | * | 7/1990 | Hilbert | B60J 3/023 296/97.1 |
| 4,953,064 A | * | 8/1990 | Viertel | B60J 3/023 296/97.5 |
| 4,999,746 A | * | 3/1991 | Svensson | B60J 3/0282 296/97.2 |

(Continued)

FOREIGN PATENT DOCUMENTS

JP            5572835 B2    8/2014

*Primary Examiner* — Kiran B Patel
(74) *Attorney, Agent, or Firm* — Hauptman Ham, LLP

(57) ABSTRACT

A sun visor for automobiles that makes operation smooth and minimizes a reaction force, the sun visor includes a sun visor body including a supporter receiver (Rs) having both side walls, a top surface and a bottom surface; a shaft horizontally disposed in the supporter receiver through one side wall; and a supporter received in the supporter receiver (Rs) of the sun visor body, and rotatably supported by shaft support holes, to which the shaft is inserted, while horizontal movement of the supporter is limited, in which upper and lower portions of front and rear surfaces of the supporter are provided with upper support curved surfaces and lower support curved surfaces in a longitudinal direction which are opposite to each other.

3 Claims, 3 Drawing Sheets

(56) References Cited

U.S. PATENT DOCUMENTS

| | | | | |
|---|---|---|---|---|
| 5,004,288 A * | 4/1991 | Viertel | B60J 3/0217 | 296/97.11 |
| 5,011,211 A * | 4/1991 | Svensson | B60J 3/0282 | 296/97.1 |
| 5,026,108 A * | 6/1991 | Leahy | B60J 3/0204 | 296/97.11 |
| 5,107,569 A * | 4/1992 | Hughes | B60J 3/0213 | 16/2.1 |
| 5,199,132 A * | 4/1993 | Gabas | B60J 3/0265 | 16/342 |
| 5,251,949 A * | 10/1993 | Miller | B60J 3/0265 | 16/297 |
| 5,338,083 A * | 8/1994 | Gute | B60J 3/0265 | 296/97.12 |
| 5,350,212 A * | 9/1994 | Corn | B60J 3/0208 | 296/97.11 |
| 5,383,700 A * | 1/1995 | Agro | B60J 3/0252 | 296/97.12 |
| 5,454,617 A * | 10/1995 | Welter | B60J 3/0204 | 296/97.12 |
| 6,099,066 A * | 8/2000 | Corn | B60J 3/0208 | 296/97.11 |
| 6,131,985 A * | 10/2000 | Twietmeyer | B60J 3/0239 | 296/97.1 |
| 6,264,264 B1 * | 7/2001 | Kato | B60J 3/0265 | 296/97.12 |
| 6,634,696 B1 * | 10/2003 | Tiesler | B60J 3/0204 | 296/97.1 |
| 2004/0090080 A1 * | 5/2004 | Yasuhara | B60J 3/02 | 296/97.9 |
| 2005/0230997 A1 * | 10/2005 | Tiesler | B60J 3/0278 | 296/97.1 |
| 2005/0236865 A1 * | 10/2005 | Torii | B29C 49/20 | 296/97.9 |
| 2006/0110155 A1 * | 5/2006 | Kouchi | B60R 11/04 | 396/419 |
| 2006/0113819 A1 * | 6/2006 | Remy | B60J 3/0278 | 296/97.11 |
| 2006/0175860 A1 * | 8/2006 | Umemura | B60J 3/0252 | 296/97.9 |
| 2006/0175861 A1 * | 8/2006 | Ikeda | B60J 3/0252 | 296/97.9 |
| 2006/0267369 A1 * | 11/2006 | Kearns | B60J 3/0265 | 296/97.12 |
| 2006/0291668 A1 * | 12/2006 | Totani | B60R 11/02 | 381/86 |
| 2009/0134657 A1 * | 5/2009 | Asai | B60J 3/0239 | 296/97.11 |
| 2010/0001548 A1 * | 1/2010 | Okazaki | B60J 3/0239 | 296/97.2 |
| 2010/0019527 A1 * | 1/2010 | Asai | B60J 3/0217 | 296/97.1 |
| 2011/0260492 A1 * | 10/2011 | Ogawa | B60J 3/0239 | 296/97.11 |
| 2012/0119537 A1 * | 5/2012 | Fukatsu | B60J 3/0278 | 296/97.1 |
| 2013/0320698 A1 * | 12/2013 | Asai | B60J 3/0239 | 296/97.1 |
| 2013/0320699 A1 * | 12/2013 | Asai | B60J 3/0239 | 296/97.5 |
| 2015/0165877 A1 * | 6/2015 | Cha | B60J 3/0252 | 296/97.5 |
| 2015/0165879 A1 * | 6/2015 | Cha | B60J 3/0265 | 359/844 |
| 2016/0288626 A1 * | 10/2016 | Aoki | F16F 1/16 | |

* cited by examiner

SUN VISOR FOR AUTOMOBILES

CROSS REFERENCE

This application claims the benefit of Korean Patent Application No. 10-2018-0068298 filed with the Korean Intellectual Property Office on Jun. 14, 2018, the disclosures of which are incorporated herein by reference.

BACKGROUND OF THE INVENTION

Field of the Invention

The present invention relates to a sun visor for automobiles that can shade eyes of a driver from the glare of sunlight, and more particularly, to a sun visor that allows a sun visor body to smoothly move in a horizontal direction and maintains position stability of the sun visor body in a stopped state, as well as minimizing vibration and noise generated when a vehicle is driving.

Background of the Related Art

In order to secure a field of vision of a driver from headlights of oncoming vehicles or the glare of sunlight which are referred to as sunlight, sun visors are mounted inside vehicles to shade the eyes of the driver from the glare of sunlight. If such a sun visor is supported by an L-shaped shaft which is connected to a bracket supported to be able to rotate in a horizontal direction in the vehicle, the sun visor can be moved in a horizontal direction within a predetermined range, as well as being rotated around the horizontal shaft.

The sun visor is configured so that the sun visor body is able to move in the horizontal direction within a predetermined range with respect to a supporter supported by the shaft, thereby adjusting a shading range to a certain degree in the horizontal direction with respect to a front or lateral side of the vehicle. Also, since the supporter installed inside the sun visor body is able to rotate around the shaft, the sun visor can adjust the shading range to a certain degree in a vertical direction.

One example of the sun visor according to the related art is disclosed in Japanese Patent No. 5572835. The above sun visor has problems of vibration and noise generated when a vehicle is driving, which are the most important in consideration. A configuration capable of smoothly moving a sun visor body in a horizontal direction is also important in view of operation.

In the sun visor according to the related art, for example, since there is a surface contact between the sun visor body and a supporter when the sun visor body is moving in the horizontal direction, the sufficient smooth movement of the sun visor body is hardly achieved due to a frictional force. It is advantageous that the sun visor body and the supporter maintain an elastic contact state in a vertical direction and a forward/backward direction to prevent noises from being generated due to vibration, but the configuration of the related art cannot solve the above problem.

SUMMARY OF THE INVENTION

Therefore, one object of the present invention is to provide a sun visor capable of minimizing vibration and noise from being generated when a vehicle is driving.

Another object of the present invention is to provide a sun visor capable of maximizing convenience in usage by minimizing a frictional force when a sun visor body is moved in a horizontal direction.

According to the present invention, a sun visor body includes a supporter receiver having both side walls, a top surface and a bottom surface. A shaft is horizontally disposed in the supporter receiver through one side wall, and is supported by a vertical support end to be able to rotate in a horizontal direction. A supporter is received in the supporter receiver of the sun visor body, and is rotatably supported by shaft support holes, to which the shaft is inserted, while horizontal movement of the supporter is limited.

Upper and lower portions of front and rear surfaces of the supporter are provided with upper support curved surfaces and lower support curved surfaces in a longitudinal direction which are opposite to each other, the respective curved surfaces having a first radius of curvature. An inner surface of the sun visor body is provided with upper rail curved surfaces and lower rail curved surfaces in the longitudinal direction at positions corresponding to the upper support curved surfaces and the lower support curved surfaces to be brought into line contact with the upper support curved surfaces and the lower support curved surfaces, the rail curved surfaces having a second radius of curvature smaller than the first radius of curvature.

According to one embodiment of the present invention, sides of the supporter are provided with elastic arms which are elastically engaged to engaging holes formed on both sides ($22a$ and $22b$) of the supporter receiver, respectively.

According to another embodiment, the shaft support holes are formed in a pair of upper arms provided on an upper portion of the supporter, and the upper support curved surfaces are respectively formed on upper arms, and lower support curved surfaces are respectively formed on both sides of the lower portion of the supporter.

With the above configuration of the present invention, there is a line contact between the sun visor body and the supporter when the sun visor body is moved in the horizontal direction, thereby minimizing a frictional resistance and thus achieving smooth operation.

Since the contact surfaces between the sun visor body and the supporter are formed as curved surfaces having different radius of curvature, the sun visor body and the supporter are supported in two axis directions (X- and Y-axis) in the strong contact state, except for the moving direction (Y-axis) of the sun visor body, thereby maximally suppressing the noises from being generated due to the vibration or a clearance in this direction.

BRIEF DESCRIPTION OF THE DRAWINGS

FIG. 1A and FIG. 2B is a view of a sun visor according to one embodiment of the present invention, in which FIG. 1A shows the entire sun visor body and FIG. 1B shows a half sun visor body.

DETAILED DESCRIPTION OF THE PREFERRED EMBODIMENT

One embodiment of the present invention will now be described in detail with reference to the accompanying drawings.

Figure 1A:
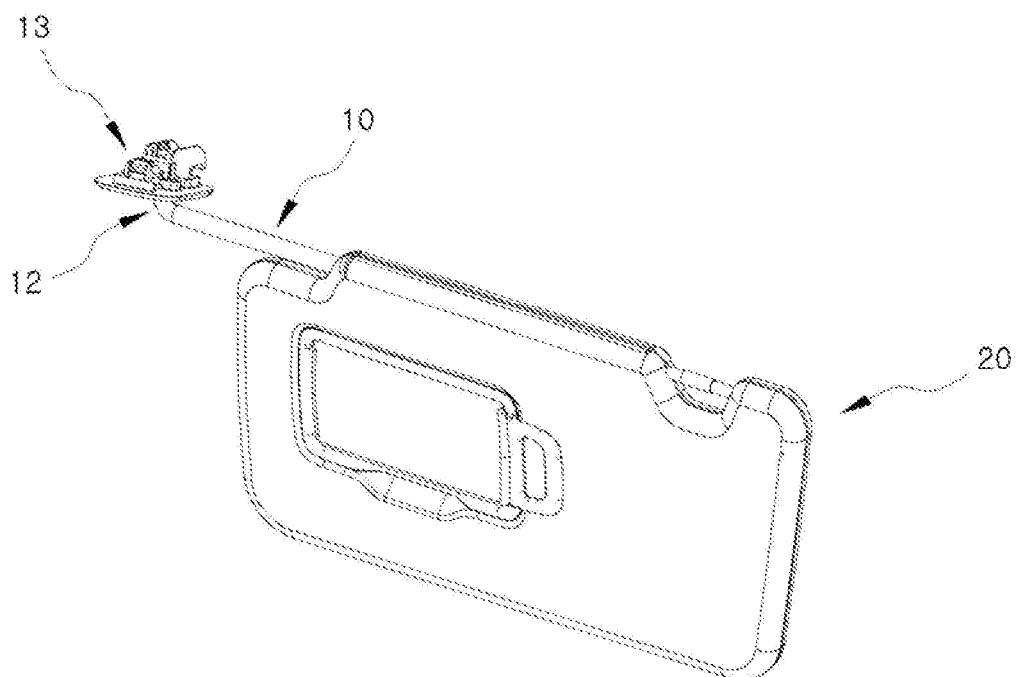
Figure 1B:
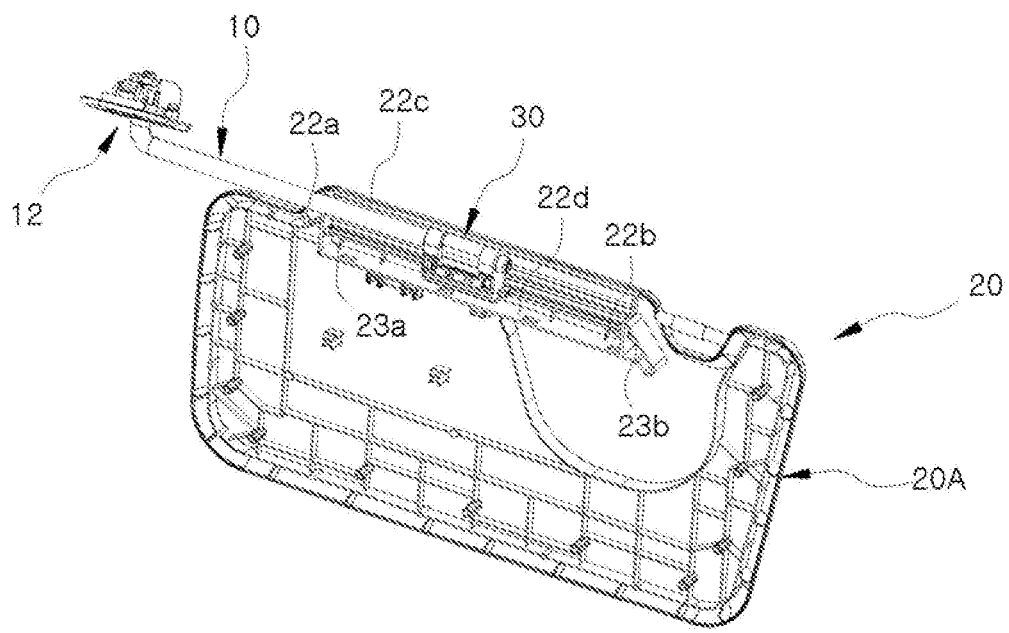

FIG. 1A is a view of a sun visor according to one embodiment of the present invention, in which FIG. 1A shows the entire sun visor body and FIG. 1B shows a half sun visor body to illustrate an inside thereof. It will be understood from the drawing that the sun visor includes a shaft 10 rotatably installed in an inside of a vehicle, a sun visor body 20 of a plate shape to shade the eyes of a driver from the glare of sunlight, and a supporter 30, supported by the shaft 10 in the sun visor body 20, to support horizontal movement of the sun visor body 20.

The shaft 10 installed in a horizontal direction is supported to rotate in a horizontal direction from a front side to a lateral side, since a vertical end 12 of the shaft is rotatably installed to a bracket 13. Accordingly the shaft 10 is installed to be able to rotate in the horizontal direction, thereby selectively blocking the sunlight entering through a windshield or a door glass, A horizontal portion 14 of the shaft 10 is inserted in and fixed to the sun visor body 20 to support horizontal movement of the sun visor body 20.

Figure 2:
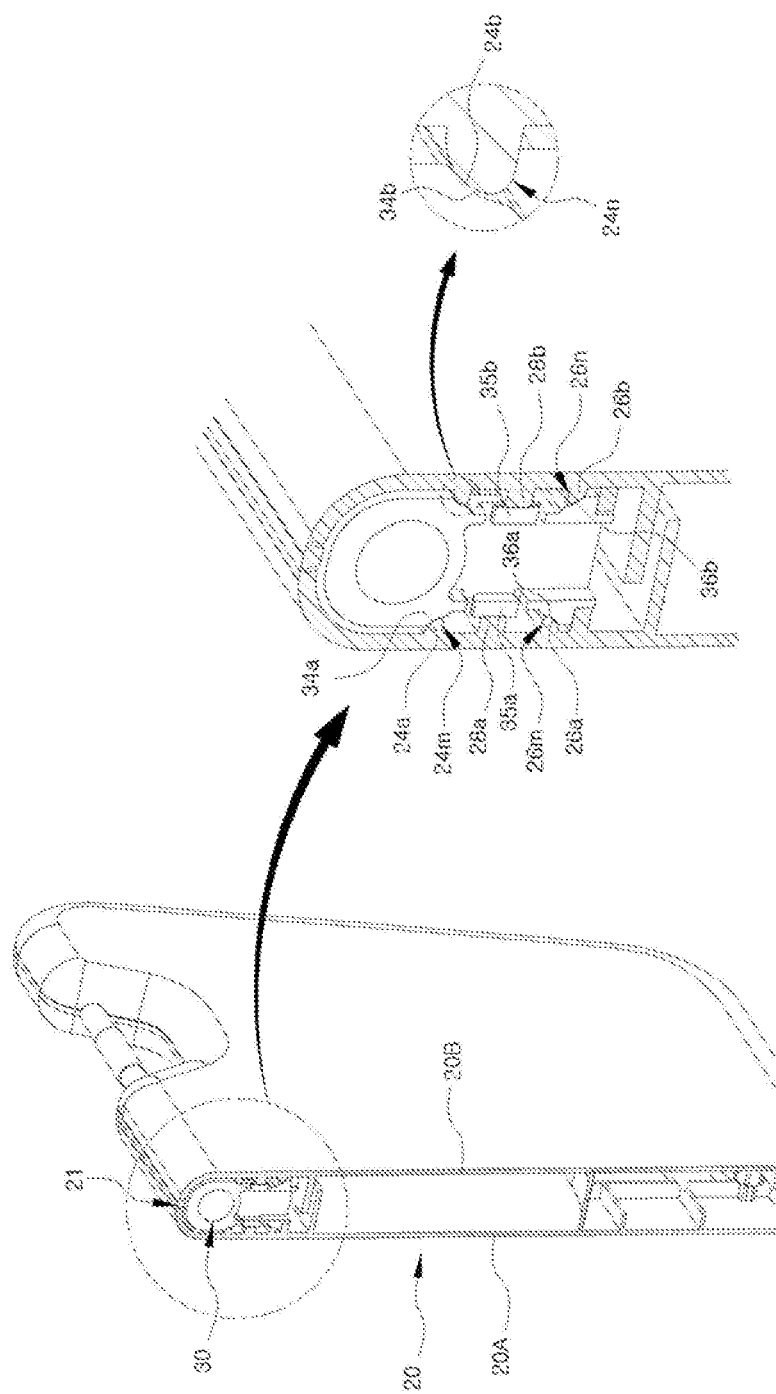
FIG. 2 is a perspective view of the sun visor according to the embodiment, in which a cross section of the sun visor is taken along a vertical line.

As illustrated in FIG. 1A, FIG. 1B, and FIG. 2 it will be understood that the sun visor body 20 is made of synthetic resin, and after a first section 20A and a second section 20B, which are symmetrical to each other to form a front surface and a rear surface respectively, are rotated around a hinge 21, and are connected to each other, these sections are bonded to each other, in a state in which a center is empty, by high frequency fusion. Inner surfaces of the first and second sections 20A and 20B to form the sun visor body 20 are generally provided with ribs of various shapes to reinforce its strength.

As illustrated in FIG. 2, the inside of the sun visor body 20 is formed with a supporter receiver Rs which is a space to receive the supporter 30. The supporter receiver Rs is a space formed by both side walls 22a and 22b which are partitions formed in the sun visor body 20, and a top surface 22c and a bottom surface 22d, as illustrated in FIG. 1B.

Preferably, both side walls 22a and 22b, the top surface 22c and the bottom surface 22d which form the supporter receiver Rs are formed on the first and second sections 20A and 20B of the sun visor body at the same positions. If both side walls 22a and 22b, the top surface 22c and the bottom surface 22d are formed on at least a portion of the first and second sections 20A and 20B, it is possible to sufficiently form the above supporter receiver Rs.

Figure 3:
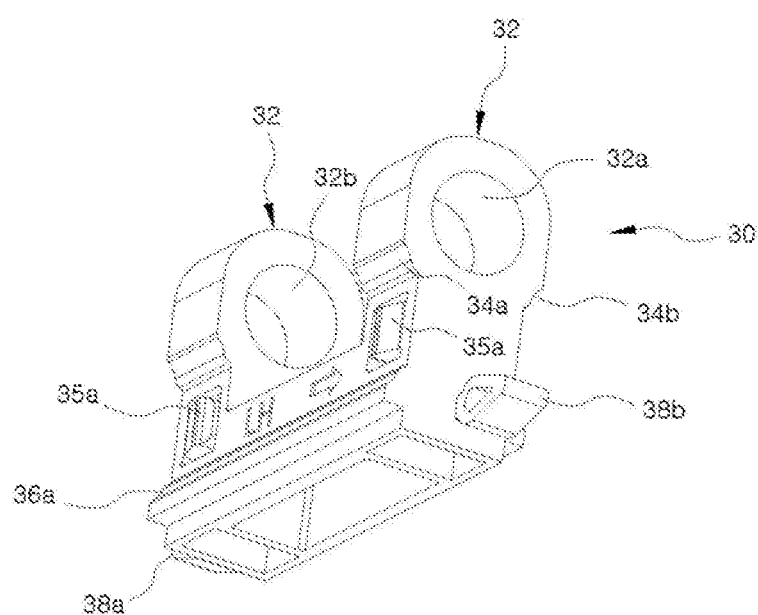
FIG. 3 is a perspective view of a supporter for the sun visor according to the embodiment.

As illustrated in FIG. 2, the supporter 30 is installed in the supporter receiver Rs configured as described above. The supporter 30 is engaged to the horizontal portion 14 of the shaft 10, and is supported at a predetermined position. As illustrated in FIG. 3, arm support portions 32 which are the upper portion of the supporter are formed with shaft support holes 32a and 32b to which the shaft 10 is inserted. In the illustrated embodiment, it will be understood that the upper portion of the supporter 30, and the respective upper arm support portions 32 is formed with each other shaft support holes 32a and 32b.

The front and rear surfaces of the supporter 30 are provided with the sun visor body 20 and a support structure which is configured to support the sun visor body 20 generally moving in the horizontal direction. In this embodiment, the sun visor body 20 is supported by the supporter 30 which is supported by the shaft 10, and is able to move in the horizontal direction. The sun visor body 20 has a contact structure capable of maintaining a line contact if possible, in consideration of the movement of a contact state.

The front and rear surfaces of the supporter 30 are respectively provided with a pair of upper support curved surfaces 34a and 34b and a pair of lower support curved surfaces 36a and 36b in a longitudinal direction (a sliding direction of the sun visor body). The first upper support curved surface 34a formed on an upper portion of the first surface (e.g., a rear surface) of the supporter 30 has a curved surface facing downwardly. The first upper support curved surface 34a is formed to extend in the horizontal direction (a horizontal direction), and is formed in the shape of a curved surface having a first radius of curvature, when seen from a longitudinal cross section.

The second upper support curved surface 34b formed on the second surface (e.g., a front surface) of the supporter 30 has a curved surface facing downwardly. The second upper support curved surface 34b is formed to extend in the horizontal direction (a horizontal direction), and is formed in the shape of a curved surface having the first radius of curvature, when seen from a longitudinal cross section. In this embodiment shown herein, the upper support curved surfaces 34a and 34b have the same radius of curvature.

The first lower support curved surface 36a formed on a lower portion of the first surface of the supporter 30 has a curved surface facing upwardly, and is formed to extend in the horizontal direction. The first lower support curved surface 36a is formed in the shape of a curved surface having the first radius of curvature, when seen from a longitudinal cross section. The second lower support curved surface 36b formed on a lower portion of the second surface of the supporter 30 has a curved surface facing upwardly, and is formed to extend in the horizontal direction. The second lower support curved surface 36b is formed in the shape of a curved surface having the first radius of curvature, when seen from a longitudinal cross section.

The first upper support curved surface 34a and the first lower support curved surface 36a formed on the upper and lower portions of the first surface (e.g., the rear surface) of the supporter 30 are the curved surface facing each other and having a circular arc having the same direction to form one circle. Also, the second upper support curved surface 34b and the second lower support curved surface 36b formed on the upper and lower portions of the second surface (e.g., the front surface) of the supporter 30 are the curved surface facing each other and having a circular arc having the same direction to form one circle.

The upper and lower portions of the first section 20A of the sun visor body 20 are provided with a first upper rail 24m and a first lower rail 26m at positions corresponding to the first upper support curved surface 34a and the first lower support curved surface 36a, respectively. Also, the upper and lower portions of the second section 20B of the sun visor body 20 are provided with a second upper rail 24n and a second lower rail 26n at positions corresponding to the second upper support curved surface 34b and the second lower support curved surface 36b, respectively.

The first upper rail 24m, the first lower rail 26m, the second upper rail 24n and the second lower rail 26n are respectively formed in the shape of a rail protruding from the inner surface of the sun visor body 20 in the horizontal direction. Outer surfaces of the first upper rail 24m, the first lower rail 26m, the second upper rail 24n and the second lower rail 26n are provided with a first upper rail curved surface 24a, a first lower rail curved surface 26a, a second upper rail curved surface 24a and a second lower rail curved surface 26s, respectively, each having a second radius of curvature.

The respective support curved surfaces and the respective rail curved surfaces have the radius of curvature interfering in each other, in which the support curved surface formed on the outer surface of the supporter 30 has the first radius of curvature, while the rail curved surface formed on the inner surface formed on the inner surface of the sun visor body 20 has the second radius of curvature. Since the first radius of curvature is larger than the second radius of curvature, if one portion having the first radius of curvature comes into contact with the other portion having the second radius of curvature, there is a line contact along a moving direction of the sun visor body 20.

Explaining the embodiment illustrated in an enlarged view of FIG. 2, the second upper support curved surface 34*b* is brought into contact with the second upper rail curved surface 24*b* of the second upper rail 24*n*. A radius of curvature (the second radius of curvature) of the second upper support curved surface 34*b* is larger than a radius of curvature (the second radius of curvature) of the second upper rail curved surface 24*b*. Accordingly, if the second upper support curved surface 34*b* is brought into contact with the second upper rail curved surface 24*b*, there is a line contact along a sliding direction. Such a line contact is equally applied to the relation between four support curved surfaces formed on both sides of the supporter 30 and four rail curved surfaces formed on the inner surface of the sun visor body.

With the above configuration of the illustrated embodiment, it will be understood that the shaft support holes 32*a* and 32*b* are formed in the pair of the upper arm 32 provided on the upper portion of the supporter 30, the upper support curved surfaces are respectively formed on the upper arm 32, and the lower support curved surfaces are respectively formed on both sides of the lower portion of the supporter.

Both sides of the supporter 30 are provided with a plurality of elastic arms 35*a* and 35*b*. The elastic arms 35*a* and 35*b* are made of synthetic resin having elasticity, and protrude outwardly from the side. The elastic arms 35*a* and 35*b* are brought into contact with elastic arm support rails 28*a* and 28*b* formed on the inner surfaces of the first section 20A and the second section 20B of the sun visor body 20 in the longitudinal direction, thereby preventing the supporter 30 from moving in a back and forth direction (an X-axis direction on the basis of FIG. 1B).

In the illustrated embodiment, the elastic arms 35*a* and 35*b* are formed to extend in a lateral direction, but the present invention is not limited thereto. For example, the elastic arms 35*a* and 35*b* may be extended in an upward or downward direction, and in this instance, should be brought into elastically contact with the elastic arm support rails 28*a* and 28*b*. If the elastic arms 35*a* and 35*b* are formed to extend in an upward or downward direction, the elastic arms may be configured to be brought into line contact with the elastic arm support rails 28*a* and 28*b* in the moving direction.

Left and right sides of the supporter 30 according to the embodiment are provided with elastic hooks 38*a* and 38*b*. The elastic hooks 38*a* and 38*b* are elastically engaged to engaging holes 23*a* and 23*b* formed on both side walls 22*a* and 22*b* of the supporter receiver Rs. As illustrated in FIG. 3, the elastic hooks 38*a* and 38*b* may be formed in one piece having elasticity in such a way that each front end has an acute angle, and middle portions are spaced apart from each other. Alternatively, as illustrated in FIG. 1B, the elastic hooks 38*a* and 38*b* may be formed to have a semicircular cross section which is symmetrical to each other, so that the elastic hooks can be elastically engaged to the engaging holes 23*a* and 23*b*. In other words, since the elastic hooks 38*a* and 38*b* according to this embodiment are elastically engaged to the engaging holes, the elastic hooks 38*a* and 38*b* may be formed in any one of various shapes, if the sun visor body 20 can maintain its position in the state of being moved to the leftmost or rightmost.

The operation of the sun visor according to this embodiment configured as described above will now be described briefly. The shaft 10 is horizontally maintained inside the vehicle, and the vertical support end 12 is rotatably supported with respect to the vehicle. The shaft 10 is assembled to the inside of the supporter receiver Rs in the sun visor body 20, while penetrating one side. The shaft 10 is supported in the state of being inserted in the supporter support holes 32*a* and 32*b* of the supporter 30. In this instance, the supporter 30 is able to rotate around the shaft 10, but is not moved in the longitudinal direction (from side to side). Such a structure is widely known in the art, and thus the detailed description will be omitted herein.

The supporter 30 is supported by the supporter receiver Rs which is the space formed in the sun visor body 20, and the sun visor body 20 can be moved from side to side within the range of the left and right length of the supporter receiver Rs. The horizontal movement of the sun visor body 20 is substantially relative movement to the supporter 30. When the sun visor body 20 is moved from side to side, the support curved surfaces 34*a*, 34*b*, 36*a* and 36*b* of the supporter are brought into contact with the respective rail curved surfaces 24*a*, 24*b*, 26*a* and 26*b* of the first upper and lower rails 24*m* and 26*m* and the first upper and lower rails 24*n* and 26*n*.

The support curved surfaces 34*a*, 34*b*, 36*a* and 36*b* of the supporter and the rail curved surfaces 24*a*, 24*b*, 26*a* and 26*b* are respectively formed to have the curved cross section, and the radius of curvature of the support curved surfaces 34*a*, 34*b*, 36*a* and 36*b* is larger than that of the rail curved surfaces 24*a*, 24*b*, 26*a* and 26*b*. Accordingly, if the support curved surfaces are brought into contact with the rail curved surfaces, there is the line contact according to the moving direction of the sun visor body 20. The line contact can minimize a reaction force of the movement caused by the frictional force, and thus it is expected to make operation convenient and smooth.

If the members having two radiuses of curvature are brought into contact with each other, the sufficient support force is generated in an X-axis direction and a Z-axis direction, on the basis of the direction in FIG. 1B, and thus it is expected to prevent relative motion (vibration) to the X-axis direction and the Z-axis direction. When the sun visor body is moved in an Y-axis direction or is maintained in a fixed state, the elastic arms 35*a* and 35*b* formed on both surfaces of the supporter 30 are brought into elastically contact with the elastic arm support rail 28, and thus it is expected to further prevent the motion and noise from generating.

If the sun visor body 20 is completely moved to the outside or inside, the elastic hook 38*a* or 38*b* is engaged to the engaging hole 23*a* or 23*b* formed on both side walls 22*a* and 22*b* of the supporter receiver Rs, so that further movement of the sun visor body is stopped. In this instance, since the sun visor body 20 is elastically engaged with the supporter 30, the sun visor body cannot be moved by vibration generated when the vehicle is driving, and also it is possible to minimize the vibration and noise caused by the driving.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A sun visor for automobiles comprising:

a sun visor body (20) including a supporter receiver (Rs) having both side walls (22a and 22b), a top surface (22c) and a bottom surface (22d);

a shaft (10) horizontally disposed in the supporter receiver through one side wall (22a), and supported by a vertical support end (12) to be able to rotate in a horizontal direction; and a supporter (30) received in the supporter receiver (Rs) of the sun visor body (20), and rotatably supported by shaft support holes (32a and 32b), to which the shaft (10) is inserted, while horizontal movement of the supporter is limited, in which upper and lower portions of front and rear surfaces of the supporter (30) are provided with upper support curved surfaces (34a and 34b) and lower support curved surfaces (36a and 36b) in a longitudinal direction which are opposite to each other, the respective curved surfaces having a first radius of curvature, and an inner surface of the sun visor body is provided with upper rail curved surfaces (24a and 24b) and lower rail curved surfaces (26a and 26b) in the longitudinal direction at positions corresponding to the upper support curved surfaces (34a and 34b) and the lower support curved surfaces (36a and 36b) to be brought into line contact with the upper support curved surfaces (34a and 34b) and the lower support curved surfaces (36a and 36b), the rail curved surfaces having a second radius of curvature smaller than the first radius of curvature.

2. The sun visor for automobiles according to claim 1, wherein sides of the supporter are provided with elastic arms (38a and 38b) which are elastically engaged to engaging holes (23a and 23b) formed on both sides (22a and 22b) of the supporter receiver (Rs), respectively.

3. The sun visor for automobiles according to claim 1, wherein the shaft support holes (32a and 32b) are formed in a pair of upper arms (32) provided on an upper portion of the supporter (30), and the upper support curved surfaces are respectively formed on upper arms (32), and lower support curved surfaces are respectively formed on both sides of the lower portion of the supporter.

* * * * *